US007506163B2

(12) United States Patent
Mansz et al.

(10) Patent No.: US 7,506,163 B2
(45) Date of Patent: Mar. 17, 2009

(54) METHODS AND APPARATUSES FOR SECURITY VISUALIZATION

(75) Inventors: Robert Paul Mansz, Rothesay (CA); Ryan Groom, Hanwell (CA)

(73) Assignee: VE Networks, Saint John, New Brunswick (CA)

( * ) Notice: Subject to any disclaimer, the term of this patent is extended or adjusted under 35 U.S.C. 154(b) by 721 days.

(21) Appl. No.: 11/096,543

(22) Filed: Apr. 1, 2005

(65) Prior Publication Data

US 2006/0224888 A1 Oct. 5, 2006

(51) Int. Cl.
*G06F 9/24* (2006.01)
(52) U.S. Cl. .................................. 713/168; 713/161
(58) Field of Classification Search ............... 713/168, 713/161
See application file for complete search history.

(56) References Cited

U.S. PATENT DOCUMENTS

| 4,847,604 | A | 7/1989 | Doyle |
| 6,161,139 | A | 12/2000 | Win et al. |
| 6,636,248 | B1 | 10/2003 | Christensen et al. |
| 2002/0010679 | A1 | 1/2002 | Felsher |
| 2002/0156902 | A1 | 10/2002 | Crandall |
| 2002/0191810 | A1 | 12/2002 | Fudge et al. |
| 2003/0023878 | A1 | 1/2003 | Rosenberg et al. |
| 2004/0054898 | A1 | 3/2004 | Chao et al. |
| 2004/0168083 | A1 | 8/2004 | Gasparini et al. |
| 2004/0266491 | A1 | 12/2004 | Howard et al. |
| 2005/0015595 | A1 | 1/2005 | Edwards et al. |

FOREIGN PATENT DOCUMENTS

WO WO-02/27560 A2 4/2002

OTHER PUBLICATIONS

Paul Roberts, "VeriSign Redesigns Trust Mark Seal: New design will allow for easier identification of secure shopping sites", PCWorld.com, Nov. 4, 2003.
Justin Everett-Church, "VeriSign Seal", www.infinitumdesign.com/verisign.html, Nov. 9, 2003.
Rachna Dhamija and J.D. Tygar, "The Battle Against Phishing: Dynamic Security Skins", Symposium of Usable Privacy and Security (SOUPS), Jul. 6-8, 2005, Pittsburgh, PA, USA.
Philip E. Varner and John C. Knight, "Security Monitoring, Visualization, and System Survivability: A Position Paper for ISW-2001", Sep. 10, 2001.
PCT Notification of Transmittal of the International Search Report and The Written Opinion of the International Searching Authority, or the declaration, PCT International Search Report, Written Opinion of the International Search Report, PCT/CA2006/00425, Jul. 11, 2006, 11 pages.
PCT Notification of Transmittal of the International Search Report and The Written Opinion of the International Searching Authority, or the declaration, PCT International Search Report, Written Opinion of the International Search Report, PCT/CA2006/00450, Jul. 20, 2006, 17 pages.
S. Kent, et al. "Security Architecture for the Internet Protocol " Request for Comments (RFC) 2401, Nov. 1998.
Paul D. Robertson, et al. "Internet Firewalls: Frequently Asked Questions" Jul. 26, 2004.

*Primary Examiner*—Thomas R Peeso
(74) *Attorney, Agent, or Firm*—Blakely, Sokoloff, Taylor & Zafman LLP (57) ABSTRACT

Methods and apparatuses for preconscious security feedback. In one aspect, a method for secure communication includes: displaying a first visual cue to indicate presence of security measure for communication while an operation for a secure communication transaction is in progress; and playing a first audio cue to indicate the presence of security measure for communication while the operation for the secure communication transaction is in progress. In one embodiment, the visual and/or audio cues used provide preconscious feeling of security based on familiarity and/or historical associations to security in particular cultures.

32 Claims, 9 Drawing Sheets

METHODS AND APPARATUSES FOR SECURITY VISUALIZATION

TECHNOLOGY FIELD

At least some embodiments of the present invention relate to user interface in general, and more particularly to applications to provide secure communications over insecure communication media, such as wireless telecommunication connections.

BACKGROUND

It is understood that humans dedicate over 50% of brain function to visual information processing (see, e.g., Richard Mark Friedhoff and Mark S. Peercy: *Visual Computing*, Scientific American Library, New York, 2000).

The brain performs an astonishing mapping of visually acquired information to reflect a physical reality, and results in an efficient and faithful representation of the relationships and patterns that exist within the information (see, e.g., Nahum Gershon, Stuart Card, and Stephen G. Eick: *Information visualization tutorial*, from Proceedings of the conference on CHI 98 summary: human factors in computing systems, pp 109-110, 1998). For example, the brain has the ability of picking out a familiar face from simply a glance at a crowd of otherwise unfamiliar faces.

The parallel process of visual perception, as opposed to an inherently serial process such as reading text, increases information uptake and understanding. The highly parallel processes that handle visualization use preconscious mechanisms can produce recognition of familiar patterns far more efficiently and quickly than serial processes. For example, the process of facial recognition as a preconscious process is much faster than the process of reading comprehension, which may include cognition by viewing text, localizing to mental linguistic model, comprehension of meaning, etc.

Sonification is the mapping of data to non-speech sound. More specifically, sonification is the transformation of data relations into perceived relations in an acoustic signal for the purposes of facilitating communication or interpretation. Further information about sonification using parameters of pitch, volume, timbre, duration frequency, amplitude and rhythm can be found in G. Kramer: *Auditory Display, Sonification, Audification, and Auditory Interfaces*, Addison-Wesley, 1994.

It has been found that bi-modal visual and auditory mappings provide a more accurate understanding of the presented information and situational context. More information about bi-modal visual and auditory mappings can be found in Suresh K. Lodha, Abigail J. Joseph, and Jose C. Renteria: *Audio-visual mapping for GIS-based data: an experimental evaluation*, in Proceedings of the workshop on new paradigms in information visualization and manipulation in conjunction with the eighth ACM international conference on Information and knowledge management, pp. 41-48, 2000.

SUMMARY OF THE DESCRIPTION

Methods and apparatuses for preconscious security feedback are described here. Some of the embodiments of the present invention are summarized in this section.

In one aspect of an embodiment of the present invention, a method for secure communication includes: displaying a first visual cue to indicate presence of security measure for communication while an operation for a secure communication transaction is in progress; and playing a first audio cue to indicate the presence of security measure for communication while the operation for the secure communication transaction is in progress.

In one example of an embodiment, the first visual cue provides preconscious feeling of security in a culture. In one example, the first audio cue includes musical notes well recognized in the culture; and the musical notes provide preconscious feeling of security in the culture.

In one example of an embodiment, the first visual cue provides time dependent images, such as an animation of iconography representative of historical associations to security or a video clip.

In one example of an embodiment, the first visual cue and the first audio cue are presented to indicate one of: beginning of the secure communication transaction; successful completion of the secure communication transaction; and secure transmission in progress. In one example, the secure communication transaction is over a wireless telecommunication link.

In one example of an embodiment, the method further includes: displaying a second visual cue to indicate progress of secure transmission; displaying a third visual cue to indicate completion of the secure transmission while playing a second audio cue to indicate completion of the secure transmission.

In one example of an embodiment, data for the first visual cue and the first audio cue is access protected with encryption. In one embodiment, at least a portion of one of the first visual cue and the first audio cue includes information revealing an identity of a recipient of the secure communication transaction. Examples of such information include: a picture of the recipient; a handwriting message; and a voice message, etc.

In one example of an embodiment, at least a portion of one of the first visual cue and the first audio cue includes information personalized for a sender of the secure communication transaction; and at least a portion of one of the first visual cue and the first audio cue is retrieved from a secure server over a network connection.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

One embodiment of the present invention provides a method and system to associate visual and audio cues with digital transaction security. A visual cue may be any static image, animation, video, or any other visual artefact that may be stored in a digital form and be presented using some viewing mechanism. An audio cue may be any form of speech or other sonification that may be stored in a digital form and be presented using some form of playing mechanism.

In one embodiment, sonification and/or digitized speech, as an aid to visualization, can be used to provide a reinforcement of the mental impression of security. Sonification in complement with visual cues facilitates a significantly more efficient and expeditious preconscious sensory mapping to the desired (e.g., predefined) mental models of security.

In one embodiment of the present invention, visual and/or audio cues are used to provide a mental impression of digital security in association with a digital transaction, or the communication of any digital artefact, which is not limited to any specific exchange of a digital nature. In one embodiment, a secure communication uses at least an encryption scheme to protect against unauthorized access.

For example, a system according to one embodiment of the present invention presents an image as visual cue and a sound clip as audio cue when a digital securing mechanism is invoked, and/or when the digital securing mechanism has been completed.

For example, a system according to one embodiment of the present invention presents an animation as visual cue and a sound clip as audio cue when a digitally secured artefact is received, and/or when a digitally securing mechanism is used to retrieve the secured artefact.

In one embodiment of the present invention, the visual and audio cues are invoked according to secure states or secure objects.

For example, creating a secure state can invoke the underlying security mechanism and the presentation of visual and audio cues, such as when sending a secure message.

For example, introducing a secured object into a user's local context invokes the presentation of visual and audio cues, such as when a secured message is received at the mobile phone of a user.

In one embodiment, the selection of visual and audio cues is designed to help reinforce the association to the state of being secure. The content of visual and audio cues is designed to provide preconscious feeling of security. In one embodiment, preconscious mechanisms are used to associate the audio-visual cue to the presence of security. For example, something that is intrinsically familiar to a particular person, when used as a cue, is viable as a preconscious mechanism.

For example, visual cues can include iconography representative of historical associations to security in a particular culture. These cues may be a static image, an animation, or a brief video clip. For example, iconography of The Great Wall of China, the Forbidden City, the white dove of Peace, can be used for visual cues (e.g., in applications and products distributed in China).

For example, audio cues can include well-recognized pieces, such as the first four notes from the opening to Beethoven's Fifth Symphony. In one embodiment, the term "sonification" may broadly refer to the mapping of data to non-speech sound, which also includes the use of such musical notes from well-recognized pieces.

One embodiment of the present invention includes the personalization of the security cue.

Some detailed examples are provided below.

Figure 1:
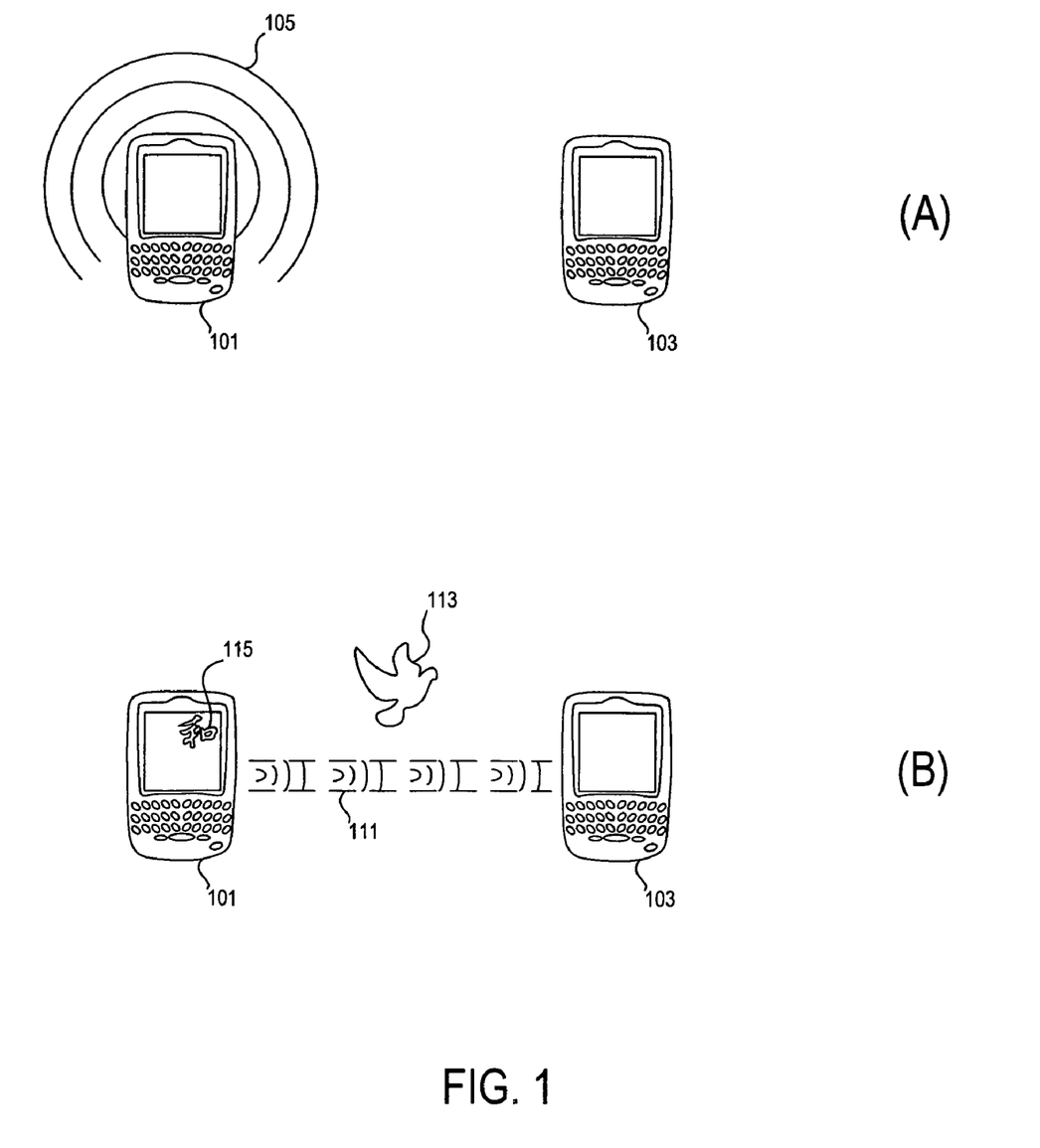
FIG. 1 shows examples of visualization schemes for secure and insecure transmissions according to one embodiment of the present invention.

FIG. 1 shows examples of visualization schemes for secure and insecure transmissions according to one embodiment of the present invention.

In FIG. 1, visualization scheme (A) is used to indicate an insecure communication session. Iconic image (101) is used to represent the sending device; and iconic Image (103) is used to represent the receiving device.

In the visualization scheme (A), the representation of transmitting wave (105) appears omni-directional, which indicates the lack of security in the communication session. It is generally perceived that omni-directional propagation is associated with broadcasting (e.g., radio), in which the content is generally not access protected.

In FIG. 1, visualization scheme (B) is used to indicate a secure communication session. Iconic image (115), showing a Chinese character having a meaning of peace, is used to represent the security application running on the sending device (101). The iconic image (115) provides a preconscious feeling of security (e.g., to people who recognize the character). In one embodiment, the iconic image (115) is animated during the beginning of a secure transaction to indicate that the security application is working to protect the message (or other types of data content to be transmitted, such as an photo image, a recorded sound clip, etc.)

In the visualization scheme (B) of FIG. 1, iconic image (113), showing a dove, is used to indicate the transmission of the data from the sending device (101) to the receiving device (103). It is generally perceived that the dove delivers messages and represents peace. Thus, the presence of the iconic image (113) provides a preconscious feeling of security.

Further, in the visualization scheme (B) of FIG. 1, a representation of transmission wave is constrained within a banded area (111), which connects the receiving device (101) and the sending device (103). Since the transmission is not omni-directional, it is generally perceived that the communication is protected for the devices involved. Thus, the banded representation of wave propagation (111), provides a preconscious feeling of security.

In one embodiment of the present invention, when the communication is insecure, the visualization scheme (A) is presented; when the communication is secure, the visualization scheme (B) is presented. Thus, a user can easily comprehend the security status of the communication. In one embodiment, when the communication is secure, the visualization scheme (B) is presented; and when the communication is insecure, no visual cue is presented.

In one embodiment of the present invention, the visual cue is presented in a time dependent fashion (e.g., as an animation, or a video loop).

Although the example visual cues in FIG. 1 may be perceived to indicate a wireless communication process, the use of such visual is not necessarily limited to a wireless communication process. The indication of secure and/or insecure nature of the visual cues can be used in other types of communication process, such as wired or temporally wired communication process. In general, the secure or insecure communication process as indicated by the visual cues of FIG. 1 can be used in a propagation medium includes various aspects of a network, including the bearer protocols (e.g., wired or wireless), intervening routing or processing nodes (e.g., routers, hubs, web servers, etc.), and communication protocols (TCP/IP, UDP, 2G Wireless PCS Circuit Switched Data, SMS/TAP/TAP+, etc.) In one embodiment, the visual/audio cues are designed to literally represent the underline communication process. However, in general, the visual/audio cues may not be interpreted literally and may not be used to literally represent the underline communication process.

Figure 2:
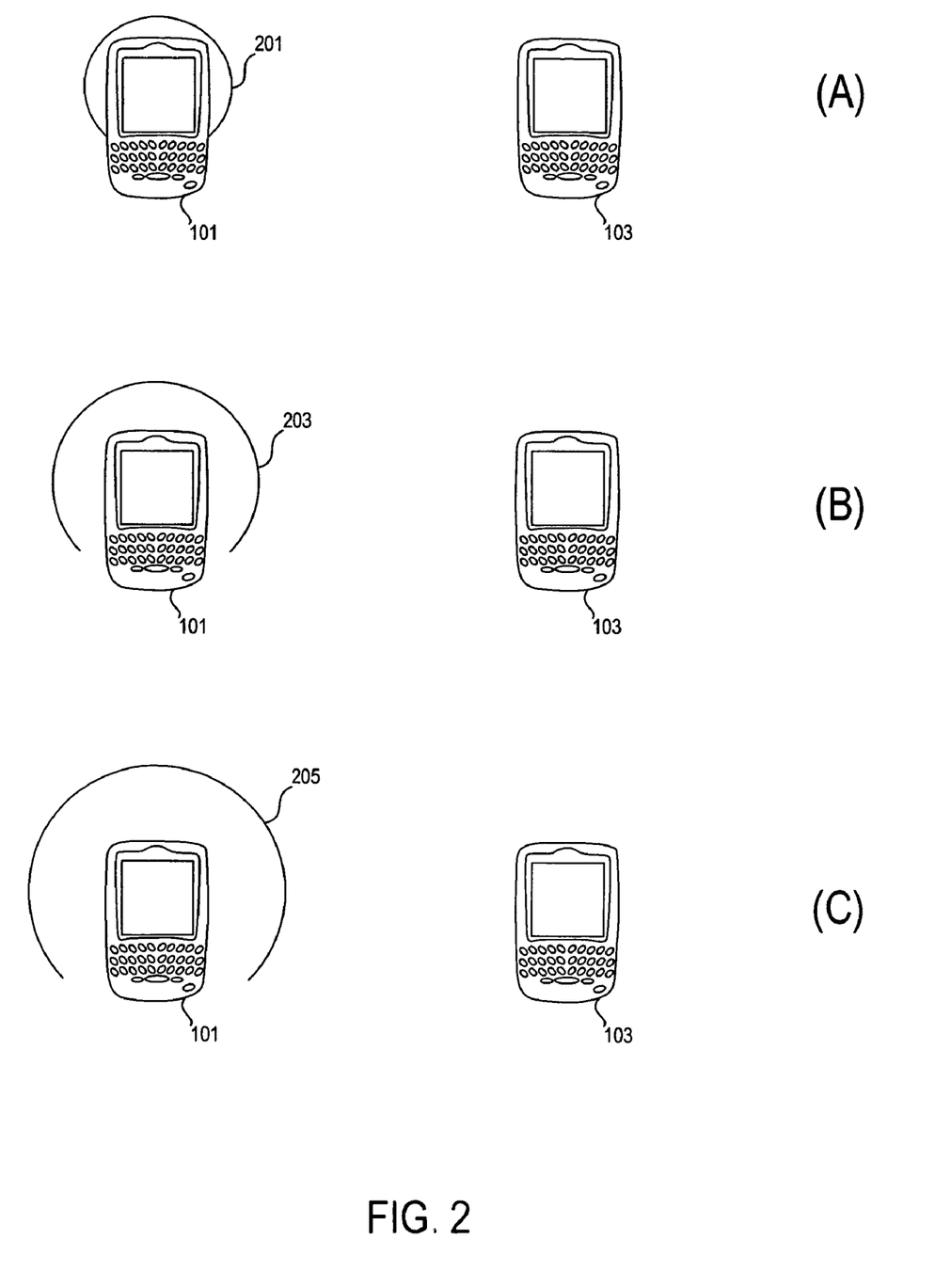
FIG. 2 shows images of an animation to indicate the lack of a security measure during transmission according to one embodiment of the present invention.

FIG. 2 shows images of an animation to indicate the lack of a security measure during transmission according to one embodiment of the present invention. In FIG. 2, screens (A), (B) and (C) are displayed sequentially and repeatedly. Thus, it is perceived that the wave front (201, 203, 205) propagates from close to the sending device to away from the sending device. Note such illustration is only used to provide a perception of a communication process. In general, the visual cue may or may not literally represent the underline communication process. For example, as the wave front propagates in the visual cue, the actual communication may be propagating on the Internet from node to node. For example, in an asynchronous communication environment (e.g. SMTP email), the actual propagation from the sending device to the receiving device may be extended in time, even days; however, the visual cue may be displayed only for a short period of time (e.g., after the email is prepared for transmission).

Figure 3:
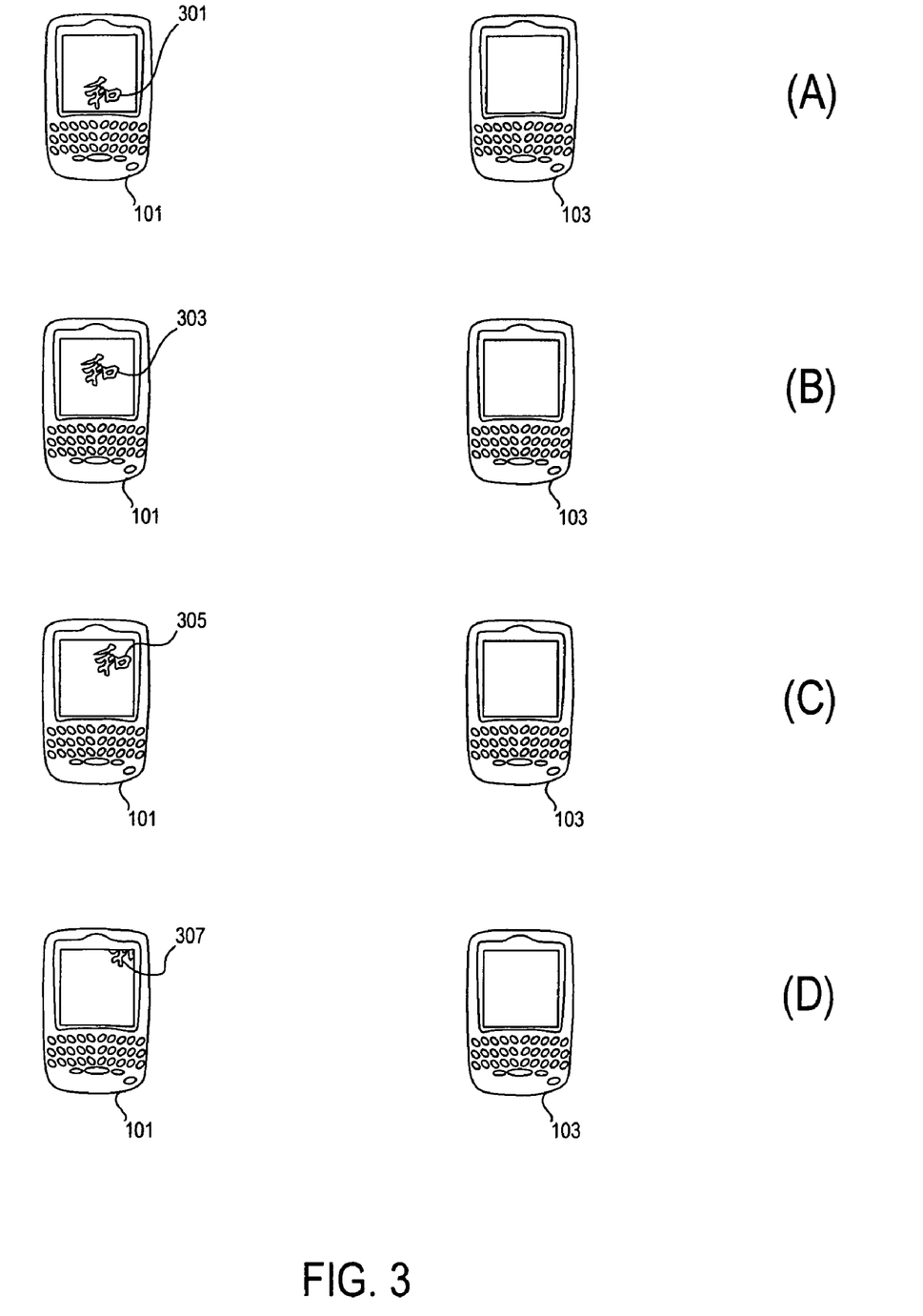
FIG. 3 shows images of an animation to indicate the deployment of a security measure according to one embodiment of the present invention.

FIG. 3 shows images of an animation to indicate the deployment of a security measure according to one embodiment of the present invention. In FIG. 3, screens (A), (B), (C) and (D) are displayed sequentially. Thus, it is perceived that the iconic image (301, 303, 305, 307) floats around in the sending device, indicating the beginning of a secure communication section. In one embodiment of the present invention, the iconic image floats off (307) the screen to indicate the leaving of the data for transmission to the receiving device. Note that FIG. 3 illustrates an example sequence. From such an illustration, a person skilled in the art can envision many different variations.

Figure 4:
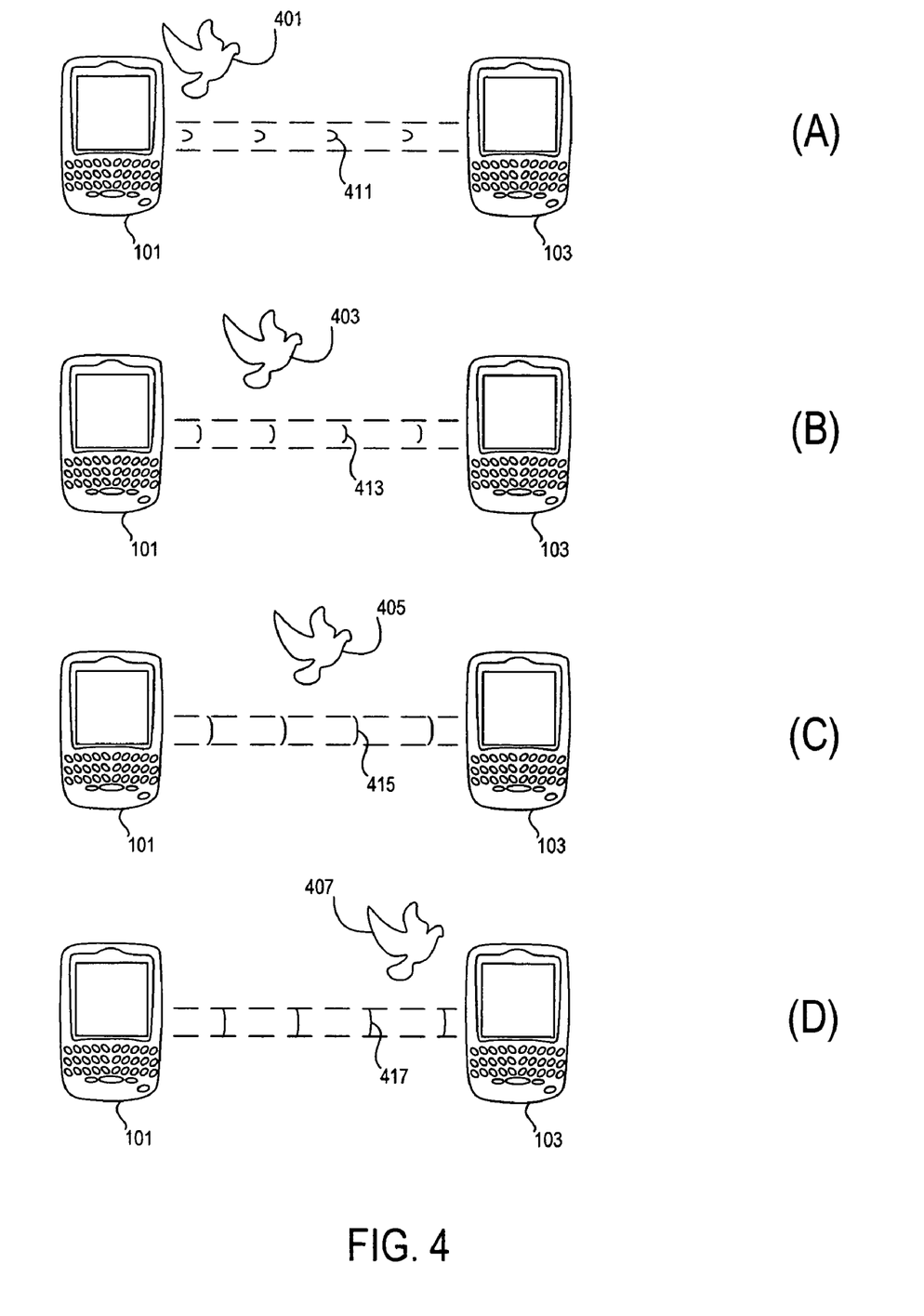
FIG. 4 shows images of an animation to indicate the presence of a security measure during transmission according to one embodiment of the present invention.

FIG. 4 shows images of an animation to indicate the presence of a security measure during transmission according to one embodiment of the present invention. In FIG. 4, screens (A), (B), (C) and (D) are displayed sequentially and repeatedly for the duration of the transmission. Thus, it is perceived that the iconic image of dove (401, 403, 405, 407) flies from the sending device (101) to the receiving device (103) to protect and deliver the content, which is represented by the transmission wave propagating (411, 413, 415, 417) from the sending device (101) to the receiving device (103).

In one embodiment, the animation of the propagating wave (411, 413, 415, 417) is synchronized with the animation of the flying dove (401, 403, 405, 407). Alternatively, the cycle of the animation of the propagating wave can be such that within one trip of the dove from the sending device to the receiving device the animation of the propagating wave is repeated multiple times. Further, in one embodiment, the position of the dove is used to indicate the completion status of the transmission (e.g., the ratio between the distances from the dove to the sending and receiving devices is used to represent the ratio between the completed portion and the portion to be completed). Alternatively, the position of the dove may not represent the completion status of the transmission (e.g., when sending a message over asynchronous channels).

In one embodiment, the animation is provided through redrawing the object that is changed (e.g., the iconic image of the dove, the wave front). Alternatively, the complete frames of images are played in a way similar to the display of a video clip.

Figure 5:
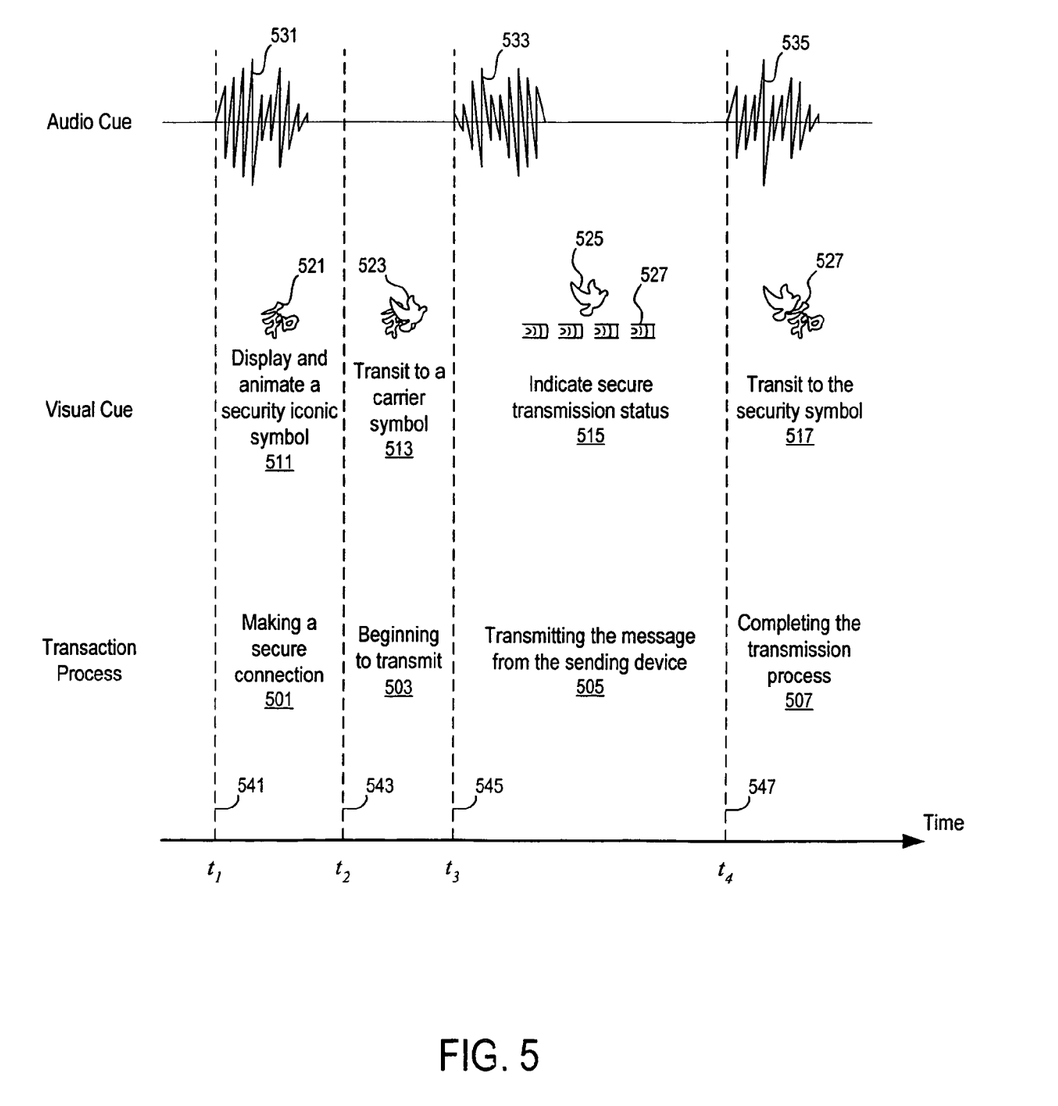
FIG. 5 illustrates the feedback provided to the user during a secure transaction according to one embodiment of the present invention.

FIG. 5 illustrates the feedback provided to the user during a secure transaction according to one embodiment of the present invention. In one embodiment of the present invention, the audio cue and visual cue are played in parallel to the progress of the transaction process.

For example, between time period $t_1$ (541) to $t_2$ (543), the transaction process is in the stage of making (501) a secure connection. In this time period, a security iconic symbol (e.g., 521) is displayed and animated (511) (e.g., within the iconic image representing the sending device) to provide the visual cue; and an audio clip (531) is played to provide the audio cue. The audio clip (531) can be a few notes from the beginning of a well-known musical piece.

Between time period $t_2$ (543) to $t_3$ (545), the transaction process is in the stage of beginning (503) to transmit. In this time period, the visual cue transits (513) into a carrier symbol (e.g., 523).

Between time period $t_3$ (545) to $t_4$ (547), the transaction process is in the stage of transmitting (505) the message from the sending device. In this time period, the visual cue displayed (525 and 527) indicates (515) the secure transmission status; and sonification (533) can be provided to indicate the progress of secure transmission.

In a time period after time $t_4$ (547), the transaction process is in the stage of completing (507) the transmission process. In this time period, the visual cue transits (517) back to the security symbol (e.g., 527), for example, within the iconic image representing the receiving device; and an audio clip (535) is played to provide the audio cue. The audio clip (535) can be a few notes from the ending portion of a well-known musical piece.

Thus, the visual and audio cues are provided in parallel with the transaction process to indicate the status of the transaction and provide the preconscious feeling of security.

In one embodiment, the data for the visual and audio cues is stored locally to the communication device (e.g., on both the originating device and the receiving device). In one embodiment, the data for the visual and audio cues is access protected (e.g., encrypted), retrievable only by an authorized programmatic agent, to preserve the integrity of the cue.

In one embodiment, the visual or audio characteristics of the cue can be altered (e.g., periodically) through a network-based process. The altering process is to be initiated by the device. In one embodiment, the cue is altered only when authorized by the user of the device. In one embodiment, altering the cue is confirmed by an out-of-band notification, through another channel, that the change has occurred.

In one embodiment, a network-based server (or device) is used to manage the cue audio/visual content. The cues may be customized and personalized by the users. For example, a user may use the network centric service to register their preference(s) regarding audio or visual content. The users may specify the visual and/or audio content of their own choice. Examples of preferences may include: an image (drawing or photo), a graphical representation of a personal text message (e.g., presented using a modified bit-mapped image to prevent automated/programmatic interpretation), a handwriting message, a voice message, a recorded sound clip, etc.

Figure 6:
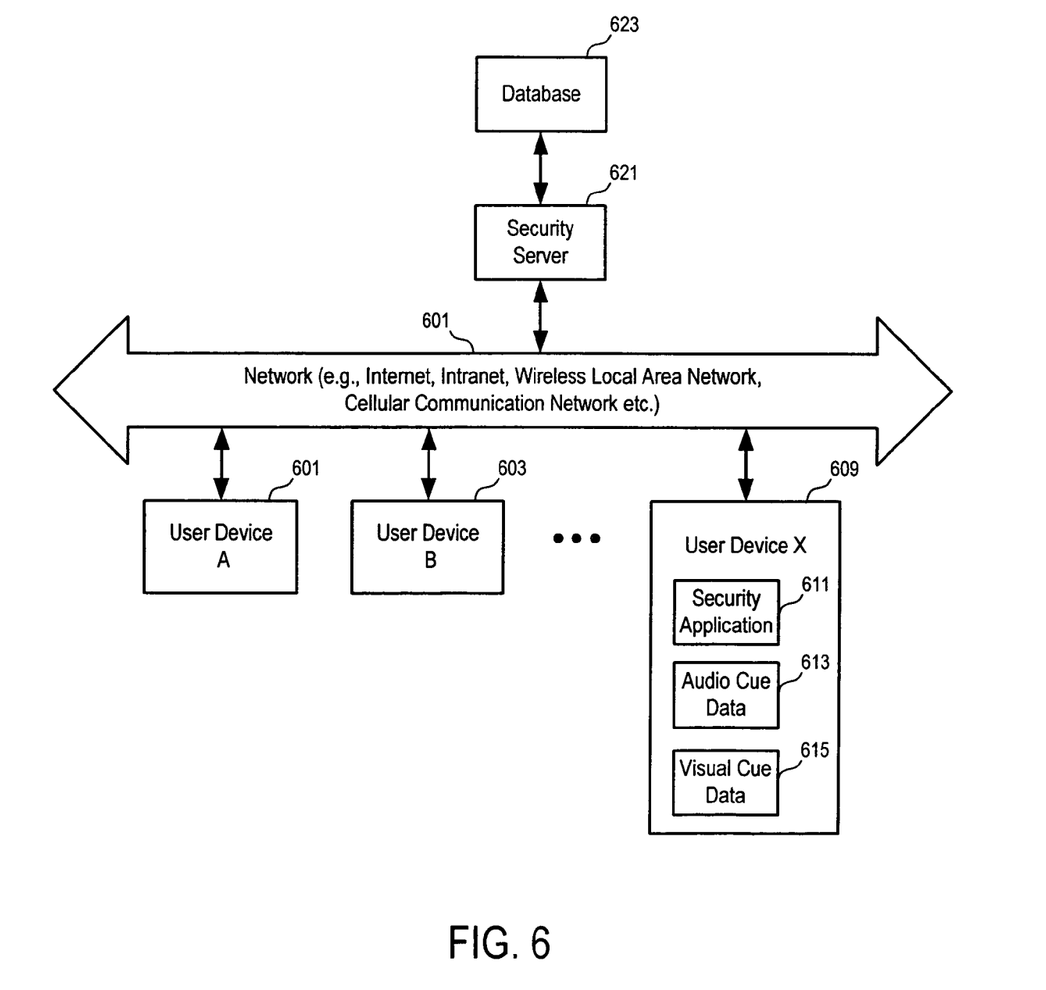
FIG. 6 illustrates one arrangement for secure transactions according to one embodiment of the present invention.

FIG. 6 illustrates one arrangement for secure transactions according to one embodiment of the present invention.

In FIG. 6, a security server (621) is used to provide services to the user devices (e.g., 601, 603, . . . , 609) across the network (601). The network (601) may include one or more of: Internet, Intranet, Wireless Local Area Network, Cellular communication Network, etc.

In one embodiment, the security server (621) couples with a database (623) which can be used to securely store the data for audio cue and visual cue. The security sever (621) authenticates the user devices for access to the data for audio cue and visual cue. Further, in one embodiment, the security server (621) stores the personalization/preferences information in the database (623).

In one embodiment, the network-based server (or device) provides access control to the stored audio/visual cues for the user devices.

In one embodiment, an originator of a communication session is granted one-time access to a public portion of personalized cue of the prospective recipient, using an authorization protocol controlled by the recipient (e.g., through rules expressed and managed by the recipient from a network-centric service). The public portion of the personalized cue may include information revealing the identity of the recipient (and/or the sender), such as a picture of the recipient, a handwriting message/signature of the recipient; a voice message of the recipient, etc. For example, a recognizable digitized/digital signature that confirms the identity of the sender of the secure communication transaction can be embedded within the visual cue and/or audio cue (e.g., as a watermark through blending a graphical representation of the digitized signature with the foreground image of the visual cue, or using an encryption process, using any known technology for watermarking the audio cue). Various types of graphical content, such as photos, logos, etc., can be used in the blending. In one embodiment, the cue (e.g., audio and/or visual) is served remotely from the sending/receiving device; and the digital signature/watermark is used verify the authenticity of the cue.

In one embodiment, the recipient is granted access to a public portion of personalized cue of the originator, which is typically familiar to the recipient.

Preconscious recognition occurs when a visual cue presented incorporates something intrinsically familiar to the person (e.g. recipient). For example, a picture of a close relative, wife, child, etc., optionally with a security message overlaid, can be used as visual cues for preconscious recognition. Preconscious recognition will result in immediate cognition of the identity. If any other picture were presented (e.g., through some suspicious or otherwise unapproved intervention), the user would have to consciously think about the relevance of the image, which would defeat the preconscious mechanism and should raise awareness of the likely insecure nature of the pending transaction/message.

Figure 7:
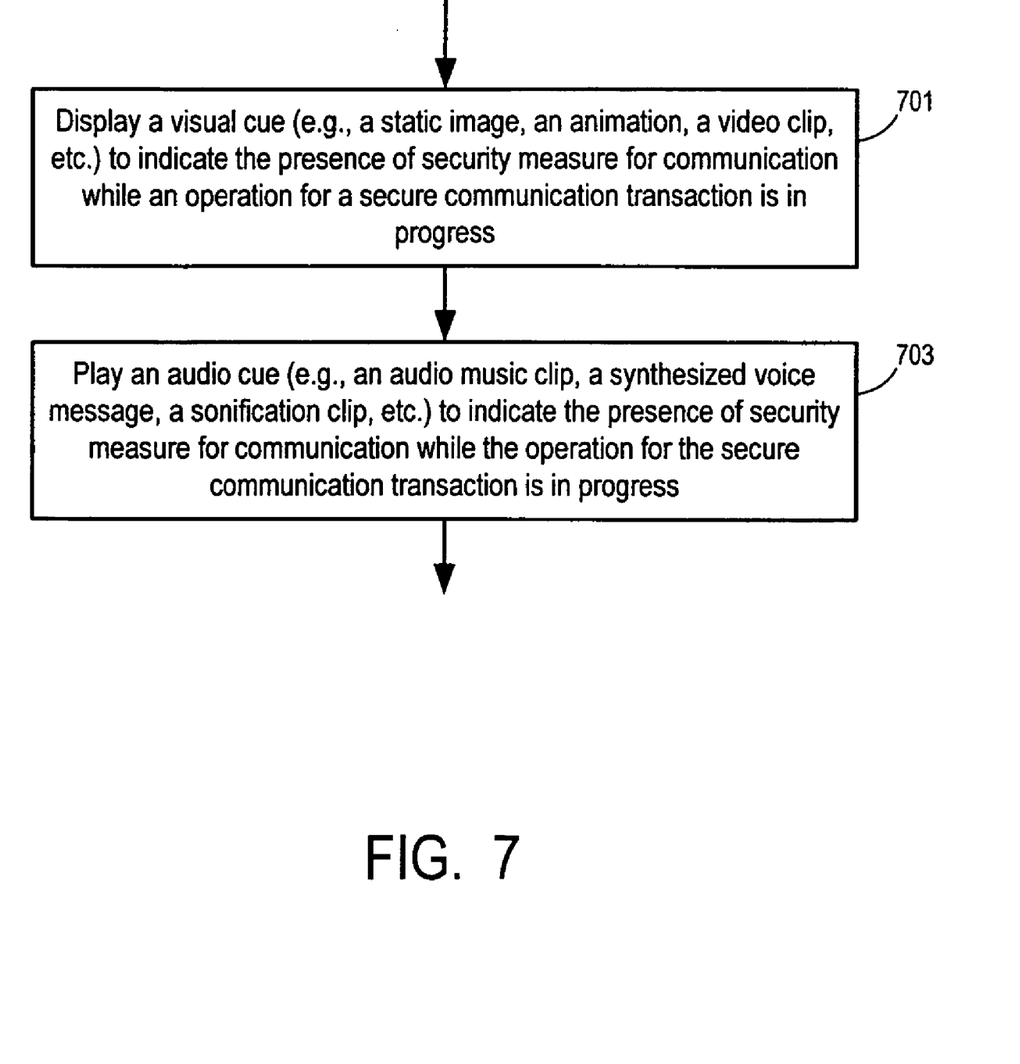
FIGS. 7-8 show methods of providing feedback to the user during a secure transaction according to one embodiment of the present invention.
Figure 8:
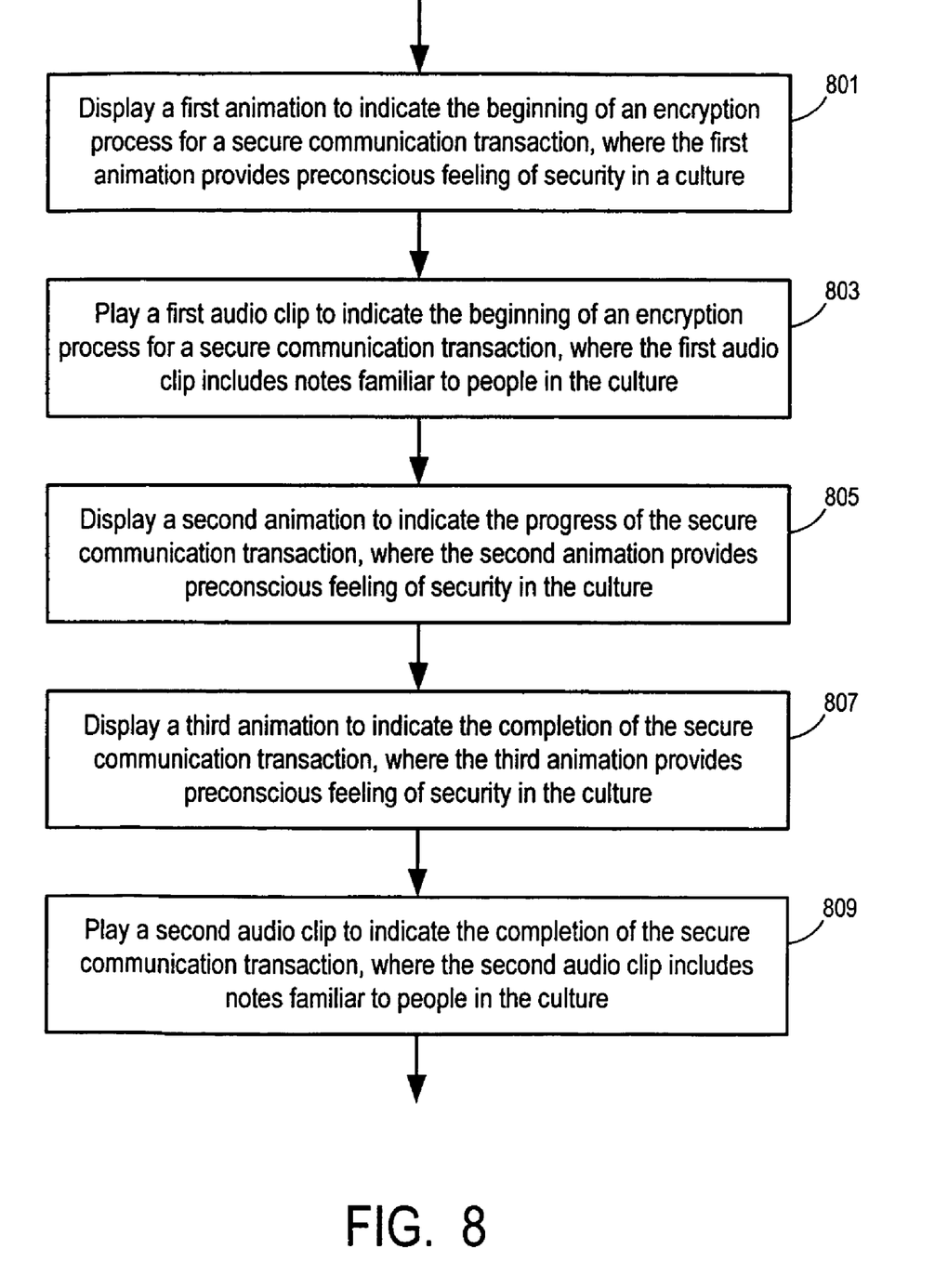

FIGS. 7-8 show methods of providing feedback to the user during a secure transaction according to one embodiment of the present invention.

In FIG. 7, operation 701 displays a visual cue (e.g., a static image, an animation, a video clip, etc.) to indicate the presence of security measure for communication while an operation for a secure communication transaction is in progress. Operation 703 plays an audio cue (e.g., an audio music clip, a synthesized voice message, a sonification clip, etc.) to indicate the presence of security measure for communication while the operation for the secure communication transaction is in progress. Thus, both the visual cue and audio cue are provided to reinforce the perception of security while reducing the burden on the user.

In FIG. 8, operation 801 displays a first animation to indicate the beginning of an encryption process for a secure communication transaction, where the first animation provides preconscious feeling of security in a culture. Operation 803 plays a first audio clip to indicate the beginning of an encryption process for a secure communication transaction, where the first audio clip includes notes familiar to people in the culture.

Operation 805 displays a second animation to indicate the progress of the secure communication transaction, where the second animation provides preconscious feeling of security in the culture.

Operation 807 displays a third animation to indicate the completion of the secure communication transaction, where the third animation provides preconscious feeling of security in the culture. Operation 809 plays a second audio clip to indicate the completion of the secure communication transaction, where the second audio clip includes notes familiar to people in the culture.

Figure 9:
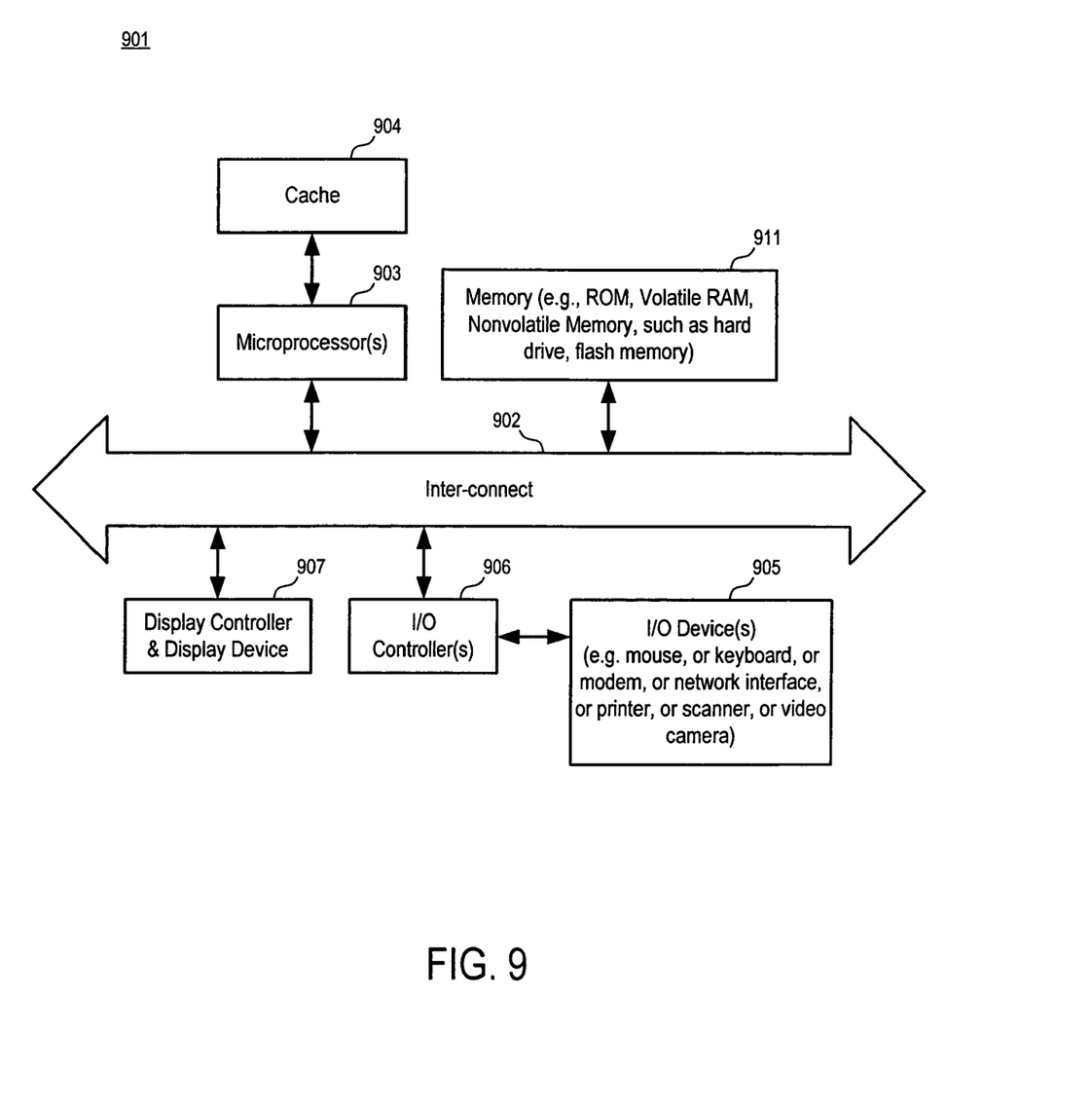
FIG. 9 shows a block diagram example of a data processing system which may be used with the present invention.

FIG. 9 shows a block diagram example of a data processing system which may be used with the present invention. Note that while FIG. 9 illustrates various components of a computer system, it is not intended to represent any particular architecture or manner of interconnecting the components. It will also be appreciated that network computers and other data processing systems, such as a handhold computer, a personal digital assistance, or a cellular phone, which have fewer or more components, may also be used with the present invention.

In FIG. 9, the communication device (901) is a form of a data processing system. The system (901) includes an inter-connect (902) (e.g., bus and system core logic), which interconnects a microprocessor(s) (903) and memory (911). The microprocessor (903) is coupled to cache memory (904) in the example of FIG. 9.

The inter-connect (902) interconnects the microprocess(s) (903) and the memory (911) together and also interconnects them to a display controller and display device (907) and to peripheral devices such as input/output (I/O) devices (905) through an input/output controller(s) (906). Typical I/O devices include mice, keyboards, modems, network interfaces, printers, scanners, video cameras and other devices which are well known in the art.

The inter-connect (902) may include one or more buses connected to one another through various bridges, controllers and/or adapters. In one embodiment the I/O controller (906) includes a USB (Universal Serial Bus) adapter for controlling USB peripherals, and/or an IEEE-1394 bus adapter for controlling IEEE-1394 peripherals.

The memory (911) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment of the present invention, a server data processing system as illustrated in FIG. 9 is used as the security server (e.g., 621 in FIG. 6). In one embodiment of the present invention, a data processing system as illustrated in FIG. 9 is used as a user device (e.g., 609 in FIG. 6), which may include more or less components. A data processing system as the user terminal can be in the form of a PDA, a cellular phone, a notebook computer, a personal desktop computer, etc.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention.

While some embodiments of the invention have been described in the context of fully functioning computers and computer systems, those skilled in the art will appreciate that various embodiments of the invention are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others, and transmission type media such as digital and analog communication links for electrical, optical, acoustical or other forms of propagated signals, such as carrier waves, infrared signals, digital signals, etc.

A machine readable medium can be used to store software and data which when executed by a data processing system causes the system to perform various methods of the present invention. The executable software and data may be stored in various places including for example ROM, volatile RAM, non-volatile memory and/or cache. Portions of this software and/or data may be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects of the present invention may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the present invention. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine readable storage medium storing executable computer program instructions which when executed by a data processing system cause said system to perform a method for secure communication, the method comprising:
displaying a first visual cue to indicate presence of security measure for communication while an operation for a secure communication transaction is in progress; and
playing a first audio cue to indicate the presence of security measure for communication while the operation for the secure communication transaction is in progress.

2. The medium of claim 1, wherein the first visual cue provides preconscious feeling of security in a culture.

3. The medium of claim 2, wherein the first audio cue includes sonification well recognized in the culture.

4. The medium of claim 3, wherein the sonification comprises musical notes that provide preconscious feeling of security in the culture.

5. The medium of claim 3, wherein the first visual cue provides time dependent images.

6. The medium of claim 5, wherein the first visual cue includes an animation of iconography representative of historical associations to security.

7. The medium of claim 1, wherein the first visual cue and the first audio cue are presented to indicate one of:
beginning of the secure communication transaction;
successful completion of the secure communication transaction; and
secure transmission in progress.

8. The medium of claim 7, wherein the secure communication transaction is over a wireless telecommunication link.

9. The medium of claim 1, wherein the method comprises:
displaying a second visual cue to indicate progress of secure transmission.

10. The medium of claim 9, wherein the method comprises:
displaying a third visual cue to indicate completion of the secure transmission while playing a second audio cue to indicate completion of the secure transmission.

11. The medium of claim 1, wherein data for the first visual cue and the first audio cue is access protected with encryption.

12. The medium of claim 11, wherein at least a portion of one of the first visual cue and the first audio cue includes information revealing an identity of a recipient of the secure communication transaction.

13. The medium of claim 12, wherein the information includes one of:
   a picture of the recipient;
   a handwriting message; and
   a voice message.

14. The medium of claim 11, wherein a portion of the first visual cue includes a watermark.

15. The medium of claim 14, wherein the watermark shows a digitized signature.

16. The medium of claim 11, wherein at least a portion of one of the first visual cue and the first audio cue includes information personalized for a sender of the secure communication transaction.

17. The medium of claim 11, wherein at least a portion of one of the first visual cue and the first audio cue is retrieved from a secure server over a network connection.

18. A method for secure communication, the method comprising:
   displaying a first visual cue to indicate presence of security measure for communication while an operation for a secure communication transaction is in progress; and
   playing a first audio cue to indicate the presence of security measure for communication while the operation for the secure communication transaction is in progress.

19. The method of claim 18, wherein the first visual cue provides time dependent images capable of invoking preconscious feeling of security in a culture; the first audio cue includes musical notes well recognized in the culture to provide preconscious feeling of security.

20. The method of claim 19, wherein the first visual cue includes an animation of iconography representative of cultural associations to security.

21. The method of claim 20, wherein the first visual cue and the first audio cue are presented to indicate one of:
   beginning of the secure communication transaction;
   successful completion of the secure communication transaction; and
   secure transmission in progress;
   wherein the secure communication transaction is over a wireless telecommunication link.

22. The method of claim 18, further comprising:
   displaying a second visual cue to indicate progress of secure transmission; and
   displaying a third visual cue to indicate completion of the secure transmission while playing a second audio cue to indicate completion of the secure transmission.

23. The method of claim 18, wherein data for the first visual cue and the first audio cue is access protected with encryption; at least a portion of one of the first visual cue and the first audio cue is personalized to include one of:
   a photo picture;
   a graphical representation of a text message; and
   a voice message.

24. The method of claim 23, wherein at least a portion of one of the first visual cue and the first audio cue is retrieved from a secure server over a network connection.

25. The method of claim 18, wherein a second visual cue is displayed to indicate lack of security measure for communication while an operation for an insecure communication transaction is in progress.

26. A data processing system for secure communication, the data processing system comprising:
   means for displaying a first visual cue to indicate presence of security measure for communication while an operation for a secure communication transaction is in progress; and
   means for playing a first audio cue to indicate the presence of security measure for communication while the operation for the secure communication transaction is in progress.

27. The data processing system of claim 26, wherein the first visual cue provides an animation of iconography representative of historical associations to security in a culture; and the first audio cue includes musical notes familiar to people in the culture.

28. The data processing system of claim 26, wherein at least one of the first visual cue and the first audio cue is presented to indicate beginning of the secure communication transaction, successful completion of the secure communication transaction, and secure transmission in progress.

29. The data processing system of claim 26, further comprising:
   means for displaying a second visual cue to indicate progress of secure transmission.

30. The data processing system of claim 29, further comprising:
   means for displaying a third visual cue to indicate completion of the secure transmission while playing a second audio cue to indicate completion of the secure transmission.

31. The data processing system of claim 26, wherein data for the first visual cue and the first audio cue is access protected with encryption; and at least a portion of one of the first visual cue and the first audio cue is retrieved from a secure server over a network connection and personalized with one of:
   a photo picture;
   a graphical representation of a text message; and
   an audio record.

32. The data processing system of claim 31, comprising:
   a cellular communication transceiver.

* * * * *